C. C. COLLINS.
RESILIENT TIRE FOR VEHICLE WHEELS.
APPLICATION FILED MAR. 30, 1914.
1,206,990.
Patented Dec. 5, 1916.
2 SHEETS—SHEET 2.
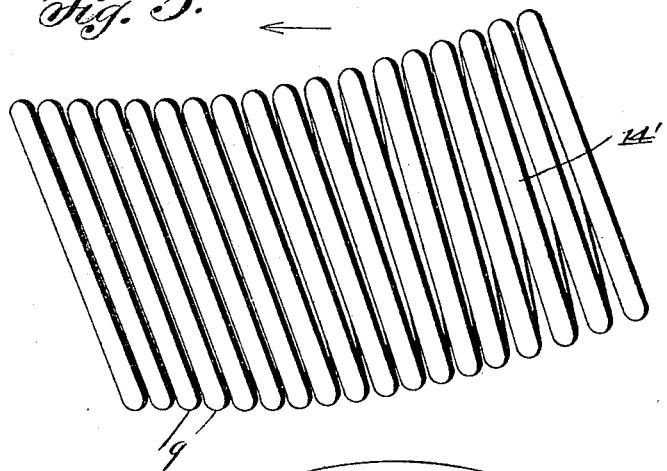
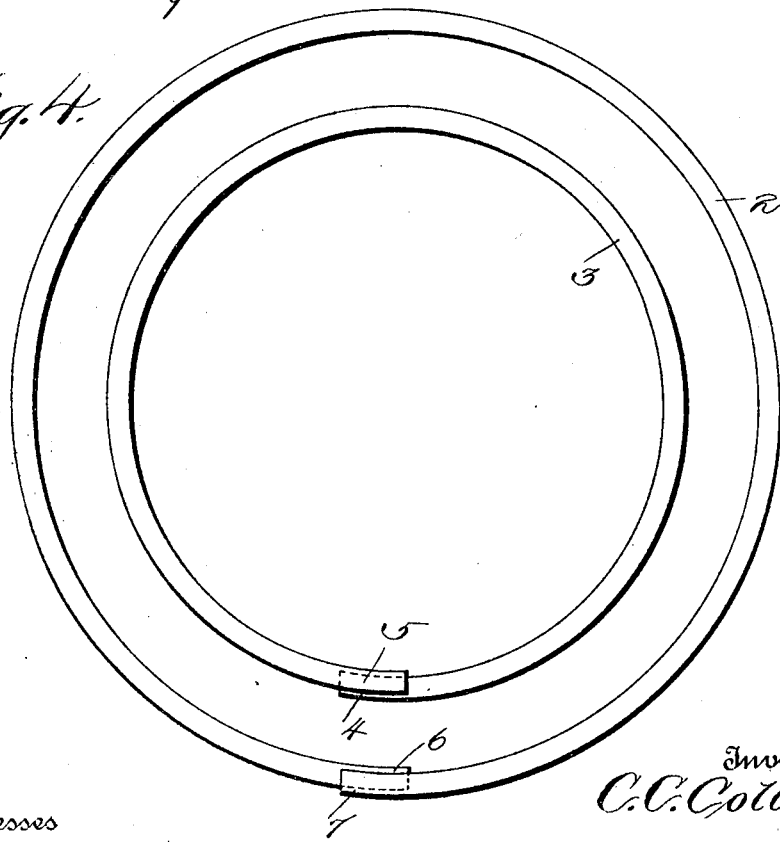
Witnesses
M. P. McKee
G. W. Bowie
Inventor
C. C. Collins
Alex. J. Wedderburn, Jr.
Attorney

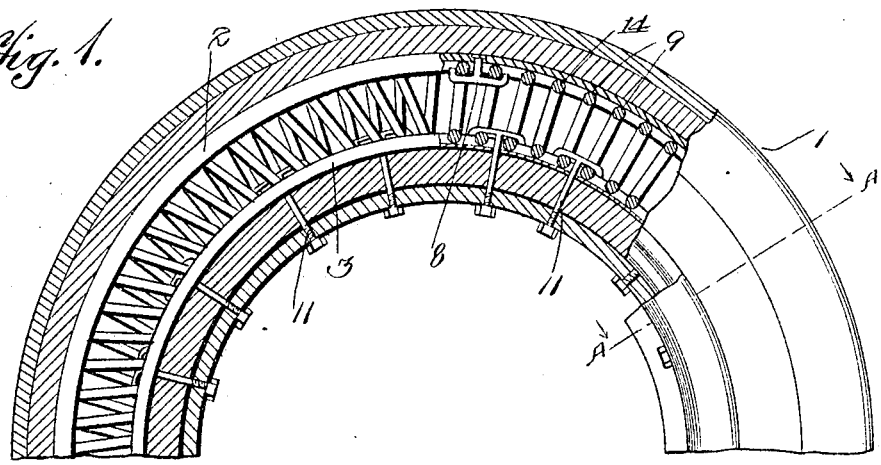
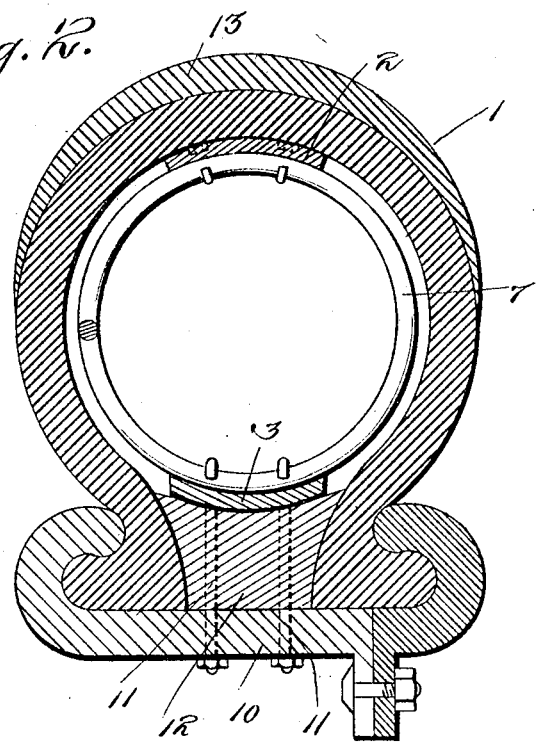

UNITED STATES PATENT OFFICE.

CLYDE C. COLLINS, OF SOUTH LEBANON, OHIO, ASSIGNOR, BY MESNE ASSIGNMENTS, TO THE SUPERIOR TIRE & RUBBER COMPANY, OF AUGUSTA, MAINE, A CORPORATION OF MAINE.

RESILIENT TIRE FOR VEHICLE-WHEELS.

1,206,990.     Specification of Letters Patent.     Patented Dec. 5, 1916.

Application filed March 30, 1914. Serial No. 828,286.

*To all whom it may concern:*

Be it known that I, CLYDE C. COLLINS, a citizen of the United States, residing at South Lebanon, in the county of Warren and State of Ohio, have invented certain new and useful Improvements in Resilient Tires for Vehicle-Wheels, of which the following is a specification.

My invention relates to resilient tires and wheels, and has for its object the provision of a hollow tire having as nearly as possible the characteristics of a pneumatic tire without the liability to collapse, which the pneumatic tire has.

My invention consists in the combination of parts and in the details of construction and arrangement of parts as will hereinafter be more fully described and claimed.

In the drawing, Figure 1 is a side elevation, partly in section, on a plane at right angles to the axis, of part of a wheel and my improved tire thereon; Fig. 2 is a cross section, enlarged, on a plane corresponding to the line A—A of Fig. 1; Fig. 3 is a detail side elevation, enlarged, of one of the spring sections, illustrating the disposition of its parts under pressure; and Fig. 4 is a detail side elevation of the inner and outer hoops or rings.

As I prefer to construct my invention, the tire outer casing 1 is of well known form, and may be of any of the usual materials, notably rubber. Inside this casing, bearing outward against its interior directly inside the tread part, is the outer hoop or ring 2 which is preferably of concavo-convex cross section, with its convex side against the concave interior of the casing 1, and preferably conforming thereto. Diametrically opposite across the substantially circular cross-section of the interior of the casing, is the inner ring or hoop 3, also of concavo-convex cross-section, but with its concave side presented radially outward toward the radially inwardly presented concave side of the outer ring 2. These rings, or hoops 2 and 3 extend entirely around the tire in their respective positions, but neither of them is continuous. The inner ring or hoop has overlapping ends 4 and 5, and the outer ring or hoop 2 has overlapping ends 6 and 7, as seen at the bottom of Fig. 4. It will be seen that where these ends of the rings overlap, the convex side of one end part rests in the concave side of the other end part, so that the end parts of the respective rings may be said to telescopically overlap, in that there is sufficient lateral engagement to keep the two meeting parts in alinement. Both end parts of the rings being thus allowed to slide over each other and be mutually guided, the rings are collapsible so that they yield to a considerable extent along with the casing 1.

Occupying the interior substantially circular cross-section of the casing 1, between the concave sides of the inner and outer rings 3 and 2, is the helical spring 14, with the outermost parts 9 of its convolutions bearing against the inner concave surface of the outer ring 2, and its innermost parts bearing against the outer concave surface of the inner ring 3.

The rim 10 of the wheel holds the casing 1 in the usual manner, and T-bolts 11 extend radially inward through the inner ring 3, and through a filler 12 which is inserted between the inner ring 3 and the rim 10 inside the casing 1, and preferably extend in through the rim 10, with nuts on their inner end parts. The branches of these T-bolts extend over adjacent convolutions of the spring 14, and bind them against the inner ring 3 when the nuts are drawn tight; so that these bolts 11 thus hold together the spring 14, the inner ring 3, the filler 12 and, if extended therethrough, the rim 10. Preferably, the spring 14 has its convolutions inclined somewhat to coincident radii of the tire. Even when not normally so formed, the relative movement circumferentially of the tire, between the tread part 13 of the tire and the parts next to the rim 10, under the influence of tractive effort, tends to pull the convolutions into such inclined positions. In either case, the result is for the outer parts 9 of the convolutions to slide somewhat in their bearing on the concave side of the rings 2 and 3, (as indicated in Figs. 1 and 3) rather than to bulge into an oval shape, as would be the case if the pressure would be applied to the convolutions vertically, i. e., along the line bisecting the angle of two lines cutting adjacent convolutions at one side of the coil, and meeting in the junction of these convolutions at the opposite side. It will be understood that, so long as this bisecting line is inclined at an angle other than ninety degrees to the axis of the coiled spring, there is this tendency to increase the inclination of the convolutions so pressed upon.

The spring 14 may be formed in one continuous piece, as shown in Fig. 1, but I prefer to provide a series of independent sections 14', as shown in Fig. 3, rather than in one continuous piece entirely around the tire, so that if any part of the spring should break or otherwise become damaged, the particular section in which the break occurs may be removed, and another one substituted; thus saving the expense of renewing the entire spring filler.

One great advantage of having the convolutions inclined is that the flexibility of the tire may be determined according to the compactness or number of convolutions of the spring; the fewer the convolutions the more space left for the inclination thereof under pressure, and the more the flexibility afforded. The collapsibility of the outer ring 2 is important, and, along with this, the free play of all or a major part of the convolutions of the spring along the inner surface of this ring is also important, as co-operating in the yielding support of the tire tread 13 in such a manner that the ease of riding is afforded without danger of collapse of the tire, either due to leakage under normal conditions, or to puncture or other accident to the tire.

Having fully described my invention, what I claim as new and desire to secure by Letters Patent is:

1. In a resilient tire, a casing, inner and outer rings within the casing, the outer ring being provided with overlapping ends rendering it collapsible, a coil spring circumferentially disposed between the inner and outer rings, with its convolutions inclined to the radius of the wheel, and means for anchoring said spring to said rings.

2. In a resilient tire, in combination with the outer flexible tire casing, of an outer ring or hoop, and an inner ring or hoop, each having overlapping, mutually guiding ends, whereby each one of said rings or hoops is materially collapsible, said outer ring or hoop lying outward against the interior of said tire casing, and by its collapsibility yielding with the casing, and a series of circumferentially extending coiled spring sections interposed between and supporting apart said inner and outer rings or hoops, with their convolutions so disposed toward said hoops as to incline and yield in their support under the pressure on the tire, and means anchoring said spring sections in said tire, but allowing play of a material proportion of their convolutions in their bearing against one of said hoops or rings, whereby said yielding is permitted.

In testimony whereof I affix my signature in presence of two witnesses.

CLYDE C. COLLINS.

Witnesses:
FRANK C. ANDERSON,
HARRY E. DILATUSH.

Copies of this patent may be obtained for five cents each, by addressing the "Commissioner of Patents, Washington, D. C."